Patented Oct. 28, 1947

2,429,603

UNITED STATES PATENT OFFICE 2,429,603

PLASTIC COMPOSITION

Joseph N. Borglin and Alfred L. Rummelsburg, Wilmington, Del., assignors to Hercules Powder Company, Wilmington, Del., a corporation of Delaware No Drawing. Application August 1, 1945, Serial No. 608,379

11 Claims. (Cl. 106—174)

This invention relates to the stabilization of cellulose ethers and, more particularly, to the production of cellulose ethers and their compositions which retain their viscosity and good color during and after exposure to heat, light, oxidation, weathering, and other degrading influences.

It has been recognized that the usefulness of cellulose ethers is impaired by the degradation effects of heat, light, weathering, etc. Although various methods of stabilizing cellulose ethers to make them resistant to decomposition have been suggested, such as hydrogenation, treatment with diazomethane, and addition of more or less effective stabilizing agents, most of which have been very expensive rare chemicals, satisfactory stabilization has not been obtained. Cellulose ether articles have become embrittled and discolored, and have suffered from crazing of surfaces, on exposure to light.

Prolonged storage of the cellulose ether flake, or heat and other conditions present during molding operations cause embrittlement of the compositions made therefrom, due to viscosity degradation of the ether, and, in addition, thereto, cause objectionable color formation. Similar effects are obtained with time after formation of an article. Previously proposed methods of stabilizing cellulose ethers have at most mitigated some of these defects. Often, improvement of one property, for example, viscosity retention, has been at the expense of another, for example, color. Crazing of the surface and formation of haze and color by exposure of films and molded articles to light and heat have not been prevented satisfactorily. To obtain a satisfactory end product, such as a film, lacquer, or molded article, it is necessary to have cellulose ether stability as well as composition stability, since, without the former, the latter is usually impossible.

Now, in accordance with this invention, the viscosity stability of cellulose ethers and their compositions has been greatly improved, while maintaining color characteristics, by the addition of a phenylol menthane. Other substituted terpenes having the general formula

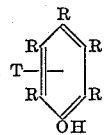

wherein T is a cyclic saturated terpene, one hydrogen of which is substituted by the phenol, one R of the phenolic group being said terpene, the other R's being hydrogen, or at least two hydrogens with the rest saturated hydrocarbon or alkoxyl groups, may likewise be employed. It has been found that the above substances exert a definite stabilizing effect on cellulose ethers and their compositions, protecting them from crazing of the surface and degradation when exposed to heat, light, air, weathering and other degrading influences.

As illustrative of carrying out the invention, the following examples are typical:

Example I

Ethyl cellulose having 48.5% ethoxyl and 100 centipoises viscosity was dissolved in 80:20 toluene: alcohol. 1 - para - phenylol para - menthane was dissolved in portions of the solution to give compositions containing in one case 1% and in another case 5% of the phenylol menthane, based on the weight of the ethyl cellulose. Films were cast from the solutions, and portions of the films thus formed were heated for 48 hours at 120° C. in air, after which they were tested, as hereinafter described, for viscosity. Films of the ethyl cellulose containing no stabilizer were also heated under the same condition. Viscosities of the samples before heat-treatment were determined and from these figures, the viscosity retention was obtained. Table I compares the results obtained with the unstabilized and stabilized ethyl celluloses:

Table I

| Sample | Per Cent Viscosity Retention |
|---|---|
| Unstablized | 35.0 |
| 1% Phenylol menthane | 79.4 |
| 5% Phenylol menthane | 76.2 |

Portions of these samples were also exposed to ultra-violet light in a Fade-Ometer machine for 100 hours. Viscosities of the exposed samples were determined, and a comparison between the samples by this test is given in Table II, below:

Table II

| Sample | Per Cent Viscosity Retention |
|---|---|
| Unstabilized | 28.7 |
| 1% Phenylol menthane | 45.6 |
| 5% Phenylol menthane | 55.9 |

Example II

Ethyl cellulose films were prepared as described in Example I, using guaiacylol menthane as the stabilizer. Table III presents a comparison of viscosity retentions obtained by heat-treating the samples as described in Example I and measuring viscosities, both before and after heat-treatment as described hereinafter:

Table III

| Sample | Per Cent Viscosity Retention |
|---|---|
| Unstabilized | 35.0 |
| 1% Guaiacylol menthane | 94.1 |

Films of these samples were exposed to ultra-violet light as described in Example I. Table IV, below, presents a comparison of the stabilities of the two films under these conditions:

Table IV

| Sample | Per Cent Viscosity Retention |
|---|---|
| Unstabilized | 28.7 (brittle) |
| 1% Guaiacylol Menthane | 100.0 (flexible) |

Examples III and IV

The following ingredients were colloided on a two-roll mill, dried, chipped into a molding powder and injection molded:

| | Parts |
|---|---|
| Ethyl cellulose (44.5% ethoxyl, 100 centipoises viscosity) | 85 |
| White mineral oil | 5 |
| Butyl oleate | 10 |
| Titanium oxide | 1 |

Similar compositions were prepared and molded containing 1% 1-para-phenylol para-menthane (Example III) and 3% 1-para-phenylol para-menthane (Example IV), respectively, based on the weight of the ethyl cellulose. The colloiding temperature was 170–180° C. The molded pieces were test bars ½ x ½ x 6 inches, molded at 195–220° C. for 10 minutes.

Portions of each molded bar were dissolved in 70:30 toluene : alcohol and tested for viscosity as described hereinafter. Portions of each molding powder (colloided and dried, but not molded) were also tested for viscosity. Table V, below, compares the viscosity stabilities of the various compositions which had been molded as described:

Table V

| Example | Sample | Per Cent Viscosity Retention |
|---|---|---|
| III | Unstabilized | 41 |
| | 1% Phenylol menthane | 62 |
| IV | 3% Phenylol menthane | 80 |

The three molding powders were molded at 195–220° C. for 10 minutes to form discs 4 inches in diameter and ¼ inch thick. These were exposed for 100 hours to an S-1 sun lamp-fog box cycle as hereinafter described. Table VI, below, gives a comparison of the appearance of the three molded discs after this exposure:

Table VI

| Example | Sample | Appearance |
|---|---|---|
| III | Unstabilized | Brown—Surface crazed. |
| | 1% Phenylol menthane | No color change or crazing. |
| IV | 3% Phenylol menthane | Do. |

Examples V and VI

The following ingredients were colloided together and molded as described in the previous Examples III and IV:

| | Parts |
|---|---|
| Ethyl cellulose (44.5% ethoxyl, 100 centipoises viscosity) | 85 |
| White mineral oil | 5 |
| Butyl oleate | 10 |
| Zinc sulfide | 2.5 |

Similar compositions were prepared and molded, containing 1% phenylol menthane (Example V) and 3% phenylol menthane (Example VI), respectively, based on the weight of the ethyl cellulose. Viscosity stabilities of the three compositions were determined as described in the previous Examples III and IV, and are compared in Table VII, below:

Table VII

| Example | Sample | Per Cent Viscosity Retention |
|---|---|---|
| V | Unstabilized | 43 |
| | 1% Phenylol menthane | 97 |
| VI | 3% Phenylol menthane | 87 |

The three compositions were also molded into discs and exposed for 100 hours to an S-1 sun lamp-fog box cycle as described in the previous Examples III and IV. Table VIII compares the appearance of the discs after this exposure:

Table VIII

| Example | Sample | Appearance |
|---|---|---|
| V | Unstabilized | Brown—Surface crazed. |
| | 1% Phenylol menthane | No discoloration or crazing. |
| VI | 3% Phenylol menthane | Do. |

Example VII

The following ingredients were colloided on a two-roll mill at 170–180° C., dried, chipped into molding powder and molded at 195–220° C. for 10 minutes to form a test bar ½ x ½ x 6 inches:

| | Parts |
|---|---|
| Ethyl cellulose (44.5% ethoxyl, 100 centipoises viscosity) containing 0.05% copper | 82 |
| Phenyl salicylate | 4 |
| Triphenyl phosphate | 12 |
| 1-para-phenylol para-menthane | 2 |

The test bar had excellent color and color stability, high impact strength, and low water absorption.

Example VIII

Ethyl cellulose films were prepared as described in Example I, using phenylol isobornylane as the stabilizer. Phenylol isobornylane has the formula:

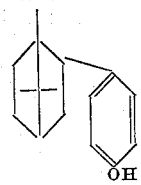

Table IX presents a comparison of viscosity retentions obtained by heat-treating the samples as described in Example I and measuring viscosities, both before and after heat-treatment as described hereinafter:

Table IX

| Sample | Per Cent Viscosity Retention |
|---|---|
| Unstabilized | 31.0 |
| 1% Phenylol isobornylane | 89.3 |

The substituted saturated cyclic terpenes which are the stabilizing substances useful according to the present invention include the reaction products of phenols with monocyclic terpenes having one double bond or with saturated terpenes as hereinafter described, or with dicyclic terpenes having only one double bond which do not isomerize to form terpenes having more than one double bond under the conditions present in the phenol condensation reaction.

The latter type of terpenes includes the bicyclic terpenes such as camphene, bornylene, alpha-fenchene, beta-fenchene, and gamma-fenchene, none of which isomerize to form terpenes having two double bonds. In these cases, the resulting products will be bornyl-, isobornyl-, etc. compounds, i. e., saturated terpene compounds with a hydrogen replaced by a phenylol or analogous radical derived from a phenol. Mixtures of the various terpenes may also be used.

A number of monocyclic dihydroterpene-phenol condensates may be utilized as cellulose ether stabilizers in accordance with this invention. Any monocyclic dihydroterpene having the formula $C_{10}H_{18}$ may be condensed with a phenol. Suitable monocyclic terpenes having an empirical formula of $C_{10}H_{18}$ are the para-menthenes, such as 1-para-menthene, 2-para-menthene, 3-para-menthene, 1(7)-para-menthene, 4(8)-para-menthene and 8-para-menthene, as well as the dihydropyronenes.

When menthenes are prepared by the hydrogenation of the exocyclic double bond in substantially pure dipentene, it is desirable that this hydrogenation be carried out to the extent of about 105% to about 110% of one double bond in order to obtain the most desirable results. This insures elimination of compounds having two double bonds in the menthene product.

The para-menthene type of terpene may be conveniently produced by hydrogenating crude dipentene in a suitable closed system using a hydrogen pressure of about 25 to about 2,000 lb./sq. in. and temperatures between about 25° C. and about 200° C. in the presence of a suitable hydrogenation catalyst. They may also be obtained by dehydration of dihydroterpineols. Monocyclic terpenes containing one double bond formed by means of liquid or vapor phase thermal isomerization of dihydropinene (pinane) are also operable.

Another type of stabilizer used according to the present invention is obtained by condensation of a phenol with saturated terpenes such as pinane and tricyclene. Although the mechanism of this type of condensation is not clear, it is believed that these saturated terpenes isomerize to form terpenes having one double bond, and that the phenol reacts at the double bond as in the case of the monocyclic dihydroterpenes or of the above terpenes having one double bond, such as camphene, to form a final product which is saturated in the terpinic portion of the molecule.

Although any phenol may be condensed with the above substances, the following are typical: phenol, ortho-, meta- and para-cresols, para-tertiary butyl phenol, para-tertiary amyl phenol, ortho-xylenol, para-xylenol, thymol, the various dialkyl hydroxybenzenes, guaiacol, etc.

A typical preparation of a phenylol saturated terpene is as follows:

The menthenes used in this preparation were obtained by the vapor phase catalytic dehydration of dihydro-alpha-terpineol at 275° C. A quantitative yield of menthene was obtained.

Four parts of $BF_3$ were absorbed in a solution of 97 parts phenol in 65 parts benzene. Eighty-eight parts of the above-prepared menthene were added dropwise with vigorous agitation to the $BF_3$ solution at a temperature of 10° C. to 20° C. Agitation was then continued for a period of 3 hours at a temperature of 20° C. to 30° C. The reaction mixture was washed with hot water to remove the catalyst and part of the unreacted phenol and the resulting water-washed mixture was subjected to evaporation at 20 mm. pressure, using a final bath temperature of 215° C. to 220° C. to remove solvent and any remaining free phenol. A substantially quantitative yield of 143 parts of residue was obtained which crystallized on standing at room temperature. One hundred twenty-five parts of the residue were vacuum distilled at about 1 to 3 mm. pressure to produce 104 parts of colorless distillate which came over at a vapor temperature of about 179° C. to about 182° C. The product crystallized on standing and had a hydroxyl content of 7.5%.

Condensation of cyclic terpenes having one double bond with a phenol in the presence of a catalyst, such as described above, is one method of forming the desired stabilizers. Other methods include the reaction of dihydroterpene halides or dihydroterpene alcohols with a phenol. The catalysts generally useful for these reactions include perchloric acid salts, $BF_3$, mixtures of mineral acids, activated siliceous materials, activated carbons, and the like.

Since the terpenes described above have or can form only one double bond, there is practically no possibility of unsaturated resins or poly phenylols being formed. This is highly advantageous, since such compounds form polymers and other components which discolor badly upon exposure to oxygen, light, heat, and other influences. The single double bond limits the molar proportions of terpene : phenol which can be attained, since no more than one mole of a phenol will react with one mole of a monocyclic dihydroterpene or a terpene having a single double bond as hereinbefore described and identified. Hence the phenylol terpene products have a terpene : phenol ratio of at least 1 : 1 and in some cases as high as about 3 : 1.

The crude phenylol terpene reaction product usually boils over a considerable range, dependent upon the identity and purity of the terpene or phenol, reaction conditions and the purity of the product. Products (or fractions thereof) which boil above about 210° C. vapor temperature have the greatest stabilizing effect, but those boiling between about 160° C. and 210° C. are also highly effective.

The chief reaction product of the condensation of a menthene with phenol will be a monophenylol menthane, with linkage chiefly in the para position of the phenol. A fraction of the product will be ortho linked. The hydrogen of the resulting saturated menthane substituted by the phenol will usually be at a tertiary carbon. For example, 1-para-menthene condenses with phenol to form a compound apparently chiefly 1-para-phenylol para-menthane and this product is so designated herein. This compound and its position isomers has the formula $C_{10}H_{19} \cdot C_6H_4 \cdot OH$. It will be noted that the terpene reacted becomes saturated. Such saturation of the terpenic portion of the stabilizer compound is essential to success since otherwise the stabilizer reacts further in preparation or in use to form colored compounds, or diphenols, which discolor. Other menthenes or mixtures of menthenes may be utilized to form various isomers, but in all cases the terpene radical of the product is saturated and cyclic.

Saturated polycyclic terpenes such as tricyclene and pinane condense with phenols to form effective stabilizers which likewise are saturated and cyclic in the terpenic radical. Isomerization of the terpene occurs in the reaction. Acyclic terpenes which are dienes in some cases cyclicize in condensation with a phenol to form suitable stabilizers with saturated cyclic terpene radicals.

Dicyclic terpenes with a single double bond and a formula of $C_{10}H_{16}$, for example, camphene, bornylene, and the fenchenes, also condense by addition with phenols to form suitable stabilizers according to the present invention. Again the terpenic radical is saturated in the product. Similarly, diterpenes with a single double bond, herein considered as terpenes, for example, the diterpenes prepared by dimerizing camphene, bornylene, and other terpenes and which may be regarded as isobornyl camphene, dicamphene, di-isobornylene or isomers thereof, react with phenols to form suitable stabilizers.

In general, it is essential that the stabilizer be saturated in the terpene portion of the compound and that only one phenol group be present in the compound. Diphenylol compounds, or those unsaturated in the terpene radical, are further reactive in use to form colored compounds and are unsuitable in the compositions according to this invention. The mono-phenylol menthanes are outstanding in effectiveness and ease of preparation. In general, the compounds utilized meet the formula

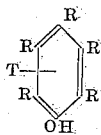

in which T is a saturated cyclic terpene one hydrogen of which is replaced by the aromatic grouping shown at one of the positions R, the remaining R positions being taken by hydrogen or by hydrogen and up to two saturated hydrocarbon or alkoxy groups. T may be respresented by menthane, pinane, carane, camphane, iso-camphane, fenchane, isobornylane, dicamphane, iso-bornyl camphane, each with one hydrogen replaced or T may be considered as a saturated cyclic radical such as a menthyl, bornyl, isobornyl or fenchyl radical. Other saturated cyclic terpene groups represented by T are, for example, pinol, cineol, pinocamphone, santenol, santenone, fenchone, fenchyl alcohol, epicamphor, menthol, carvomenthol, with one hydrogen, in each case, replaced.

It has been found that although only one phenol group may be present, more than one saturated cyclic terpene group may be included in the stabilizer molecule. Thus, in the structural formula hereinbefore given, up to two R positions, remaining after the initial terpene linkage, may be taken by further saturated cyclic terpene groups (which will in general be saturated hydrocarbon groups), instead of by hydrogen, or by saturated hydrocarbon groups such as methyl, ethyl, hexyl, cyclohexyl and the like, or alkoxy groups such as methoxyl, ethoxyl and the like, or combinations of such groups.

The subject terpene-phenols are effective stabilizers in amounts varying from about 0.5% to about 5.0% of the weight of the cellulose ether. Preferably, they will be employed in amounts between about 1% and about 3%, 1% usually being the optimum quantity to obtain satisfactory stability and other required characteristics. Larger amounts than about 5% produce no substantial additional stabilizing effect, while amounts below about 0.5% usually do not create the desired degree of stabilization.

The stabilizer may be added to the cellulose ether in a variety of ways. For example, the cellulose ether may be dissolved in a suitable solvent to which the stabilizer is added, after which solvent is removed. Alternatively, the cellulose ether may be suspended in water or a swelling medium, such as aqueous alcohol. A solution of the stabilizer may be added to the suspension in which case it is absorbed by the cellulose ether. Again the stabilizer may be added during a tumbling, stirring, or other similar operation for distributing the stabilizer through the granular cellulose ether. Incorporation of the stabilizer at some stage of manufacture is desirable, since it frequently happens that the cellulose ether is stored for considerable periods before use and the presence of an effective stabilizer prevents any substantial degradation due to aging.

If the stabilizer is not added during manufacturing, it may be added during preparation of the product in which the cellulose ether is eventually employed. For example, in cellulose ether lacquers, the stabilizer may be added to the finished lacquer or to the lacquer solvent during or prior to dissolving the other lacquer ingredients; to the mixture of ingredients prior to or during formation of a molding powder, etc.

Any organo-soluble or thermoplastic cellulose ether may be stabilized in accordance with the present invention. Cellulose ethers such as the alkyl, aralkyl, or mixed ethers may be so stabilized. Alkyl ethers include methyl, ethyl, and propyl celluloses, for example. Benzyl cellulose is a typical aralkyl cellulose. Mixed ethers are typified by ethyl benzyl, methyl ethyl, and ethyl butyl celluloses. Allyl cellulose is an example of an alkylene cellulose.

Ethyl cellulose is especially responsive to stabilization by the present method. The ethoxyl content and the viscosity of the ethyl cellulose are immaterial but usually vary within the range of about 40% to about 51%, although the types having an ethoxyl content between 43.5% and 49.0% are generally used for most purposes. For molded articles, a viscosity of about 50-250 centipoises is usually employed and films are usually made up of 20-150 centipoises viscosity grades. Lower viscosity types are usually used in lacquers, varnishes, etc., principally material of 2-50 centipoises.

In its optimum form, stabilized ethyl cellulose in accordance with this invention may also contain copper, either in the form of the metal, which may be free or chemically bound to the cellulose molecule, apparently through a carboxyl group, or in the form of an added salt or other compound such as copper acetate or sulfate. The nature of the mechanism by which copper-containing substances supplement stabilization here is not known.

Any compatible plasticizer for the cellulose ether may be used in compositions prepared in accordance with the present invention. Organic phosphates such as tributyl, triphenyl, or tricresol phosphate; phthalates such as dimethyl, diethyl, diphenyl phthalate; salicylates such as phenyl salicylate; higher fatty acids; higher fatty alcohols; vegetable and mineral oils are among the types of plasticizers which may be used. Preferably, a portion of the plasticizer is a good absorbent for ultraviolet light. In this respect, phenyl salicylate is preferred, since it has superior ultraviolet light absorbent properties, other salicylates such as menthyl salicylate and cresyl salicylate also being suitable. Plasticizers having high water resistance also are preferred, and of this group triphenyl phosphate is definitely superior. The use of a combination of plasticizers providing the combination with both ultraviolet light absorbency and high water resistance is preferred to the use of single plasticizers having only one of these properties.

Other ingredients may be employed in cellulose ether compositions, such as resins, including, for example, phenolic resins such as phenol-aldehydes, ester gums and soft alkyds, soft cumar, etc., fillers, pigments, and dyes.

In accordance with the present invention, a particularly stable ethyl cellulose composition able to withstand almost any conditions normally encountered may comprise the following ingredients:

| | Per cent |
|---|---|
| Copper-treated cellulose ether (0.01–1% Cu) | 70–85 |
| Plasticizer having high ultra-violet light absorption | 2–10 |
| Plasticizer having high water resistance | 10–20 |
| The subject phenylol terpenes as described | 0.5–5 |
| Coloring agents, pigments, resins, etc. | As desired |

The above combination of ingredients is distinguished by its superior resistance to discoloration, loss of viscosity and embrittlement when exposed to heat, light, oxygen, or out-door weathering. The plasticizer having high ultraviolet light absorption reduces to a minimum the deteriorating effects of sunlight on compositions. The highly water-resistant plasticizer prevents more than insignificant water absorption by the cellulose ether, the stabilizer or any other plasticizer which may be present. Hence, the composition is superior for any use such as in lacquers, films, or plastics since it is highly resistant to the deteriorating conditions met in the manufacture or use of the same.

Viscosities given throughout this specification are defined in terms of centipoises as determined on 5% solutions of the cellulose ether in 80:20 toluene:alcohol at 25° C. The per cent viscosity retentions were calculated by determining the viscosities of a given sample before and after treatment, such as heat-treatment, and dividing the latter by the former.

The S-1 sun lamp-fog box cycle is fully described in the Government publication dated January 24, 1944, and entitled "Federal Specifications for Plastics, Organic—General Specifications—Test Methods" under Test LP406a. The cycle includes exposure in a fog chamber for two hours, two hours' irradiation under an S-1 lamp, two hours' additional exposure in the fog chamber, followed by eighteen hours' irradiation. The cycle may be repeated any number of times.

What we claim and desire to protect by Letters Patent is:

1. A composition comprising a cellulose ether and a small amount based on the cellulose of a substituted terpene compound having the following formula:

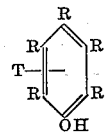

wherein T is a cyclic saturated terpene compound, one hydrogen of which is substituted by the phenolic group, one R of said phenolic group being said terpene group T, the other R's being selected from the group consisting of hydrogen, alkoxyl and saturated hydrocarbon groups, at least two R's being hydrogen, the amount of the substituted terpene compound being sufficient to stabilize the cellulose ether.

2. A composition comprising ethyl cellulose and a small amount based on the ethyl cellulose of a substituted terpene compound having the following formula:

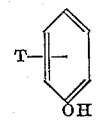

wherein T is a cyclic saturated terpene hydrocarbon, one hydrogen of which is substituted by the phenylol group, the amount of the substituted terpene compound being sufficient to stabilize the ethyl cellulose.

3. A composition comprising ethyl cellulose and a small amount based on the ethyl cellulose of a substituted para-menthane having the following formula:

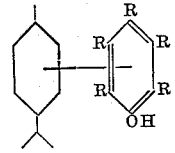

wherein one hydrogen of said monocyclic terpene is substituted by the phenolic group, one R of said phenolic group being said monocyclic terpene group, the other R's being selected from the group consisting of hydrogen, alkoxyl and saturated hydrocarbon groups, at least two R's being hydrogen, the amount of the substituted terpene compound being sufficient to stabilize the ethyl cellulose.

4. A composition comprising ethyl cellulose and from about 0.5% to about 5%, based on the ethyl cellulose, of a substituted para-menthane having the following formula:

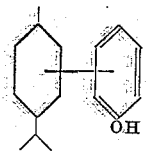

5. A composition comprising ethyl cellulose and from about 0.5% to about 5%, based on the ethyl cellulose, of a substituted para-menthane having the following formula:

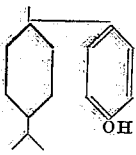

6. A composition comprising ethyl cellulose and from about 0.5% to about 5%, based on the ethyl cellulose, of a substituted isobornylane having the following formula:

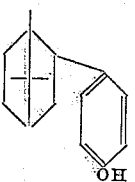

7. A composition comprising ethyl cellulose and from about 0.5% to about 5%, based on the ethyl cellulose, of a substituted para-menthane having the following formula:

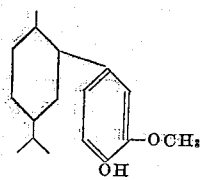

8. A plastic composition comprising

| | Per cent by weight |
|---|---|
| Copper-bearing ethyl cellulose (0.01–1% Cu) | 70–85 |
| Plasticizer for the ethyl cellulose which is compatible therewith | 10–20 |
| A substituted terpene having the following formula: | 0.5–5 |

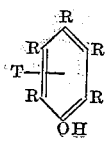

wherein T is a cyclic saturated terpene compound, one hydrogen of which is substituted by the phenolic group, one R of said phenolic group being said terpene group T, the other R's being selected from the group consisting of hydrogen, alkoxyl or saturated hydrocarbon groups, at least two R's being hydrogen.

9. A plastic composition comprising

| | Per cent by weight |
|---|---|
| Copper-bearing ethyl cellulose (0.01–1% Cu) | 70–85 |
| A plasticizer having high ultra-violet light absorption | 2–10 |
| Highly water-resistant plasticizer | 10–20 |
| A substituted terpene having the following formula: | 0.5–5 |

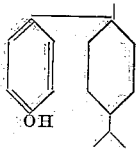

said plasticizers being compatible with copper-bearing ethyl cellulose.

10. A composition comprising a cellulose ether, a plasticizer compatible with the cellulose ether, and from about 0.5% to about 5% based on the cellulose ether of a substituted para-menthane having the following formula:

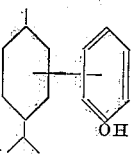

11. A composition comprising a cellulose ether, a plasticizer compatible with the cellulose ether, and from about 0.5% to about 5% based on the cellulose ether of a substituted para-menthane having the following formula:

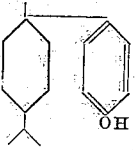

JOSEPH N. BORGLIN.
ALFRED L. RUMMELSBURG.

REFERENCES CITED

The following references are of record in the file of this patent:

UNITED STATES PATENTS

| Number | Name | Date |
|---|---|---|
| 2,046,165 | Hunt et al. | June 30, 1936 |
| 2,333,577 | Koch | Nov. 2, 1943 |

Certificate of Correction

Patent No. 2,429,603.

October 28, 1947.

JOSEPH N. BORGLIN ET AL.

It is hereby certified that errors appear in the printed specification of the above numbered patent requiring correction as follows: Column 10, line 24, after the word "cellulose" insert *ether*; column 12, line 25, after the word "with" insert *the*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*